US007769832B2

(12) United States Patent
Drucker et al.

(10) Patent No.: US 7,769,832 B2
(45) Date of Patent: Aug. 3, 2010

(54) MEDIA VARIATIONS BROWSER

(75) Inventors: Steven M. Drucker, Bellevue, WA (US);
Curtis G. Wong, Bellevue, WA (US);
Asta L. Glatzer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 937 days.

(21) Appl. No.: 11/539,963

(22) Filed: Oct. 10, 2006

(65) Prior Publication Data

US 2007/0083818 A1     Apr. 12, 2007

Related U.S. Application Data

(63) Continuation of application No. 10/174,212, filed on Jun. 18, 2002, now Pat. No. 7,194,527.

(51) Int. Cl.
*G06F 15/16* (2006.01)
(52) U.S. Cl. ...................................................... 709/220
(58) Field of Classification Search ......... 709/217–220; 715/513, 744–745, 760
See application file for complete search history.

(56) References Cited

U.S. PATENT DOCUMENTS

| 5,528,260 | A | | 6/1996 | Kent | |
|---|---|---|---|---|---|
| 6,029,195 | A | * | 2/2000 | Herz | ........................... 725/116 |
| 6,199,082 | B1 | | 3/2001 | Ferrel et al. | |
| 6,226,618 | B1 | | 5/2001 | Downs et al. | |
| 6,345,256 | B1 | | 2/2002 | Milsted et al. | |
| 6,345,293 | B1 | | 2/2002 | Chaddha | |
| 6,452,609 | B1 | * | 9/2002 | Katinsky et al. | ............. 715/716 |
| 6,557,042 | B1 | | 4/2003 | He et al. | |
| 6,564,260 | B1 | | 5/2003 | Baber et al. | |
| 7,177,650 | B1 | * | 2/2007 | Reiger et al. | ................. 455/453 |
| 7,610,394 | B2 | * | 10/2009 | Katinsky et al. | ............. 709/231 |
| 2002/0107853 | A1 | | 8/2002 | Hofmann et al. | |
| 2003/0093329 | A1 | * | 5/2003 | Gutta | ........................... 705/26 |

OTHER PUBLICATIONS

Xing Xie, Hua-Jun Zeng, and Wei-Ying Ma. Enabling Personalization Services on the Edge. ACM, 2002.
Abdulmotaleb El Saddik, Amir Ghavam, Stephan Flscher, and Ralf Steinmetz. Metadata for Smart Multimedia Learning Objects. ACM, 2000.
Teppo Kurki, Sami Jokela, Reijo Sulonen, and Marko Turpeinen. Agents in Delivering Personalized Content Based on Semantic Metadata. American Association for Artificial Intelligence, 1998.
Lowe, "Internet Explorer 3 for Windows for Dummies", 1996, IDG Books Worldwide, Inc., pp. 42-43.

* cited by examiner

*Primary Examiner*—Philip C. Lee
*Assistant Examiner*—Benjamin Ailes
(74) *Attorney, Agent, or Firm*—Lee & Hayes, PLLC

(57) ABSTRACT

A system and method facilitating media browsing is provided. The invention includes a browsing component and a media display system that provides a focus media and related media. The focus media and the related media are associated based, at least in part, upon metadata. The invention further provides for an association identifier that identifies related media based, at least in part, upon metadata associated with the focus media and the related media. The association identifier can further cluster the related media based upon metadata associated with the related media.

20 Claims, 10 Drawing Sheets

MEDIA VARIATIONS BROWSER

CROSS REFERENCE TO RELATED APPLICATIONS

This application is a continuation of U.S. patent application Ser. No. 10/174,212, filed on Jun. 18, 2002, entitled "MEDIA VARIATIONS BROWSER", the entirety of which is incorporated herein by reference.

TECHNICAL FIELD

The present invention relates generally to browsing of media, and more particularly visual browsing of media using metadata associated with focus media and media related to the focus media.

BACKGROUND OF THE INVENTION

As availability of media (e.g., movies, music, photographs, e-mail and/or messages) has increased, the task of effectively browsing media has become difficult. Conventional media browsing systems have provided limited ability for a user to browse media. Further, conventional media browsing systems are typically rigid and thus limit a user's ability to personalize media browsing systems.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a system and method for visually browsing media. In accordance with an aspect of the present invention, a media browsing system having a browsing component and a media display component. Optionally, the media browsing system can include a user selection component. The media browsing system displays a focus media and cluster(s) of related media. For example, the focus media and/or the related media can be based on movies, music, e-mail, web pages, television programs, photographs, books, art and/or travel-related information. Association of the focus media and cluster(s) of related media can be based on metadata associated with the focus media and the cluster(s) of related media. The media browsing system thus allows user(s) to visually browse media based, at least in part, upon associated metadata. Thus, the media browsing system facilitates browsing of media in a meaningful manner.

The browsing component provides the focus media and cluster(s) of related media to the media display component based, at least in part, upon metadata associated with the focus media and cluster(s) of associated media. The browsing component can analyze the focus media and identify related media based, at least in part, upon metadata associated with the focus media and the related media. Further, the browsing component can group related media into cluster(s) based, at least in part, upon metadata associated with the related media, the focus media and/or user preference(s). The browsing component can further modify the focus media provided to the media display component based, at least in part, upon a user's selection of an associated media within a cluster of related media. The optional user selection component receives information from a user regarding selection of related media and/or user preference(s). For example, the user selection component can include a mouse, a keyboard, a joystick and/or a game pad. The media display component displays the focus media and the cluster(s) of related media.

Another aspect of the present invention provides for the media display component to include a seed component and/or an historical component. The seed component provides seed (s) that can be associated with distinctive focus media. Selection of a particular seed thus facilitates browsing of media related to the seed. Thus, the seed(s) can allow a user to start or restart browsing of media.

The historical component stores historical information associated with a user's browsing of media. The historical information can be stored based, at least in part, upon user preference(s). For example, the historical component can store a particular quantity of recent browsing session(s). Additionally and/or alternatively, the historical component can store user browsing session(s) for the past day, week and/or month.

Yet another aspect of the present invention provides for the media browsing system to further include a media information store. The media information store stores media and associated metadata. Another aspect of the present invention provides for the browsing component to include a focus media component and an association identifier. The focus media component provides the focus media and/or cluster(s) of related media to the media display component. The cluster (s) of related media can be based, at least in part, upon information received from the association identifier.

The association identifier associates related media with the focus media based, at least in part, upon metadata associated with the focus media and the related media. The association identifier can analyze the focus media and identify related media based, at least in part, upon metadata associated with the focus media and the related media. Further, the association identifier can group related media into cluster(s) based, at least in part, upon metadata associated with the related media, the focus media and/or user preference(s).

Additionally, the association identifier can utilize artificial intelligence techniques (e.g., Bayesian learning methods that perform analysis over alternative dependent structures and apply a score, Bayesian classifiers and other statistical classifiers, including decision tree learning methods, support vector machines, linear and non-linear regression and/or neural network representation) in analyzing the related media and/or cluster(s) with regard to the focus media. For example, the association identifier can store information regarding a user's preference(s) regarding the selection of focus media (e.g., historical information) and/or information regarding the user (e.g., demographic information), for example, received from a user selection component. Accordingly, the association identifier can adaptively analyze media input taking into account a user's preference(s) and/or information regarding a user.

The association identifier can analyze preferences of a plurality of viewers and aggregate such preferences to facilitate optimizing the media browsing experience for the group of viewers as a whole. Further, the association identifier can cluster related media based, at least in part, upon information associated with a user (e.g., historical information regarding previous selection(s) of focus media by the user and/or demographic information), user preference(s) (e.g., quantity of clusters to be displayed), and/or information regarding the user (e.g., demographic information associated with the user).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
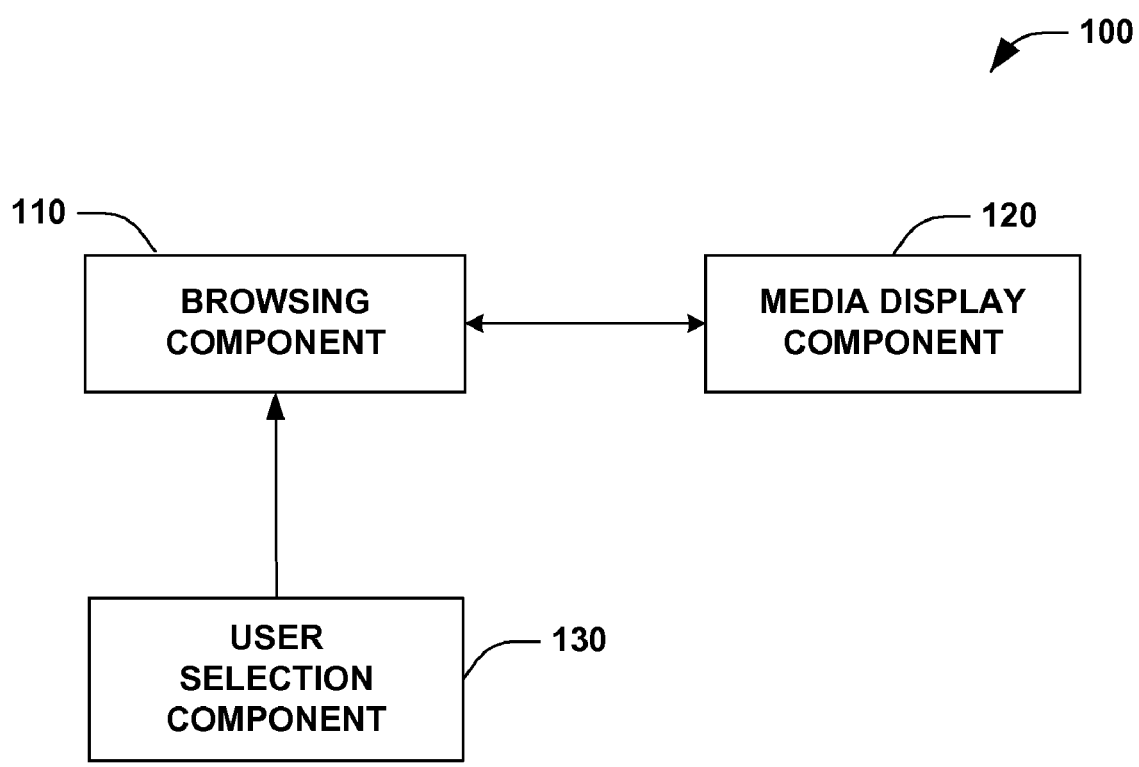
FIG. 1 is a block diagram of a media browsing system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Referring to FIG. 1, a media browsing system 100 in accordance with an aspect of the present invention is illustrated. The media browsing system 100 includes a browsing component 110 and a media display component 120. Optionally, the media browsing system 100 can include a user selection component 130. The media browsing system 100 displays a focus media and cluster(s) of related media. For example, the focus media and/or the related media can be based on movies, music, e-mail, web pages, television programs, photographs, books, art and/or travel-related information. Association of the focus media and the cluster(s) of related media can be based on metadata associated with the focus media and the cluster(s) of related media. The media browsing system 100 thus allows user(s) to visually browse media based, at least in part, upon metadata associated with media. Thus, the media browsing system 100 facilitates browsing of media in a meaningful manner.

The browsing component 110 provides the focus media and the cluster(s) of related media to the media display component 120 based, at least in part, upon metadata associated with the focus media and cluster(s) of associated media. The browsing component 110 can analyze the focus media and identify related media based, at least in part, upon metadata associated with the focus media and the related media. Further, the browsing component 110 can group related media into cluster(s) based, at least in part, upon metadata associated with the related media, the focus media and/or user preference(s). The browsing component 110 can modify the focus media provided to the media display component 120 based, at least in part, upon a user's selection of related media within a cluster. The browsing component 110 is coupled to the media display component 120, for example, via a parallel electrical connection, a serial electrical connection, a cable television connection, a computer network connection (e.g., utilizing the Internet), a Digital Subscriber Line ("DSL"), a telephone line, a cable modem, a wireless data communications link and/or an integrated services digital network ("ISDN").

The optional user selection component 130 receives information from a user regarding selection of related media and/or user preference(s). For example, the user selection component 130 can include a mouse, a keyboard, a joystick and/or a game pad. The user selection component 130 is coupled to the browsing component 110, for example, via a parallel electrical connection, a serial electrical connection, a USB bus and/or a wireless connection. The media display component 120 displays the focus media and the cluster(s) of related media.

In one implementation, the focus media is displayed at about the center of a computer display surrounded by cluster(s) of related media. For example, for movie related media, the focus media can be an image associated with a particular movie (e.g., a DVD cover and/or video-tape box). The image associated with the focus media can be displayed along with attribute(s) (e.g., actor(s), producer(s), date of release etc.) of the focus media can be displayed via the media display component 120. Likewise, associated cluster(s) of related movies can further be displayed via the media display component 120. Association of the cluster(s) with the focus media can be, for example, based on actor(s), producer(s), composer(s) and/or genre.

For example, the user selection component 130 can include a mouse used to select a particular related media of a cluster. Based, at least in part, upon the user's selection, the browsing component 110 can modify the focus media with the selected related media becoming the new focus media. Further, the browsing component 110 can analyze the new focus media and identify related media based, at least in part, upon metadata associated with the new focus media and the related media. Further, the browsing component 110 can group related media into cluster(s) based, at least in part, upon metadata associated with the related media, the new focus media and/or user preference(s).

While FIG. 1 is a block diagram illustrating components for the media browsing system 100, it is to be appreciated that the media browsing system 100, the browsing component 110, the media display component 120 and/or the user selection component 130 can be implemented as one or more computer components, as that term is defined herein. Thus, it is to be appreciated that computer executable components operable to implement the media browsing system 100, the browsing component 110, the media display component 120 and/or the user selection component 130 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 2:
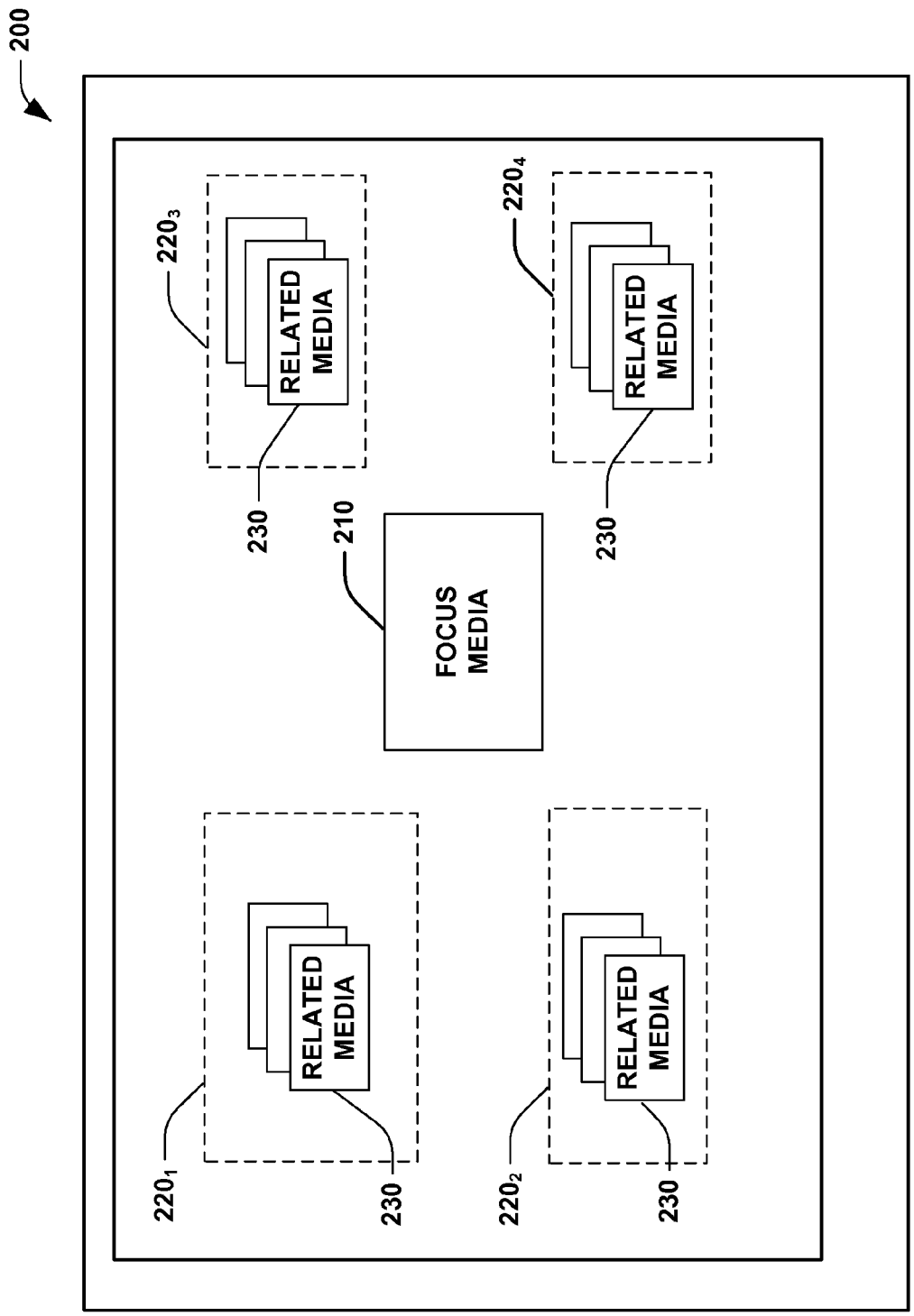
FIG. 2 is a block diagram of an exemplary media display component in accordance with an aspect of the present invention.

Turning to FIG. 2, an exemplary media display component 200 in accordance with an aspect of the present invention is illustrated. The media display component 200 can visually present information, for example, via a computer monitor, a television screen, a personal digital assistant (PDA) and/or a touch screen. The media display component 200 includes a focus media 210 and cluster(s) of related media 2201, 2202, 2203 and 2204. The cluster(s) of related media 2201, 2202, 2203 and 2204 can be referred to collectively as the cluster(s) of related media 220. The media display component 200 is depicted in FIG. 2 having four clusters of related media, 2201, 2202, 2203 and 2204; however, it is to be appreciated that the media display component 200 can include any suitable quantity of cluster(s) of related media 220. For example, the quantity of cluster(s) of related media 220 can be based, at least in part, upon a user's preference and/or physical attribute(s) associated with the media display component 200 (e.g., screen size).

The media display component 200 includes the focus media 210 displayed at about the center of the user interface 200. It is to be appreciated that the focus media 210 can be displayed in any suitable location associated with the media display component 200 in accordance with the present invention.

The cluster(s) of related media 220 includes one or more related media 230. Association of the related media 230 to the focus media 210 is made based, at least in part, upon metadata associated with the related media 230 and metadata associated with the focus media 210. Similarly, the related media 230 within a particular cluster 220 are associated based, at least in part, upon metadata.

For example, in the instance in which media display component 200 displays information associated with movies, the focus media 210 can be associated with a particular movie ("the focus movie"). The first cluster 2201 can include movies related to one actor in the focus movie. The second cluster 2202 can include movie(s) related to the producer of the focus movie. The third cluster 2203 can include movie(s) related to the music composer of the focus movie. Finally, the fourth cluster 2204 can include movie(s) related to the director of the focus movie.

Figure 3:
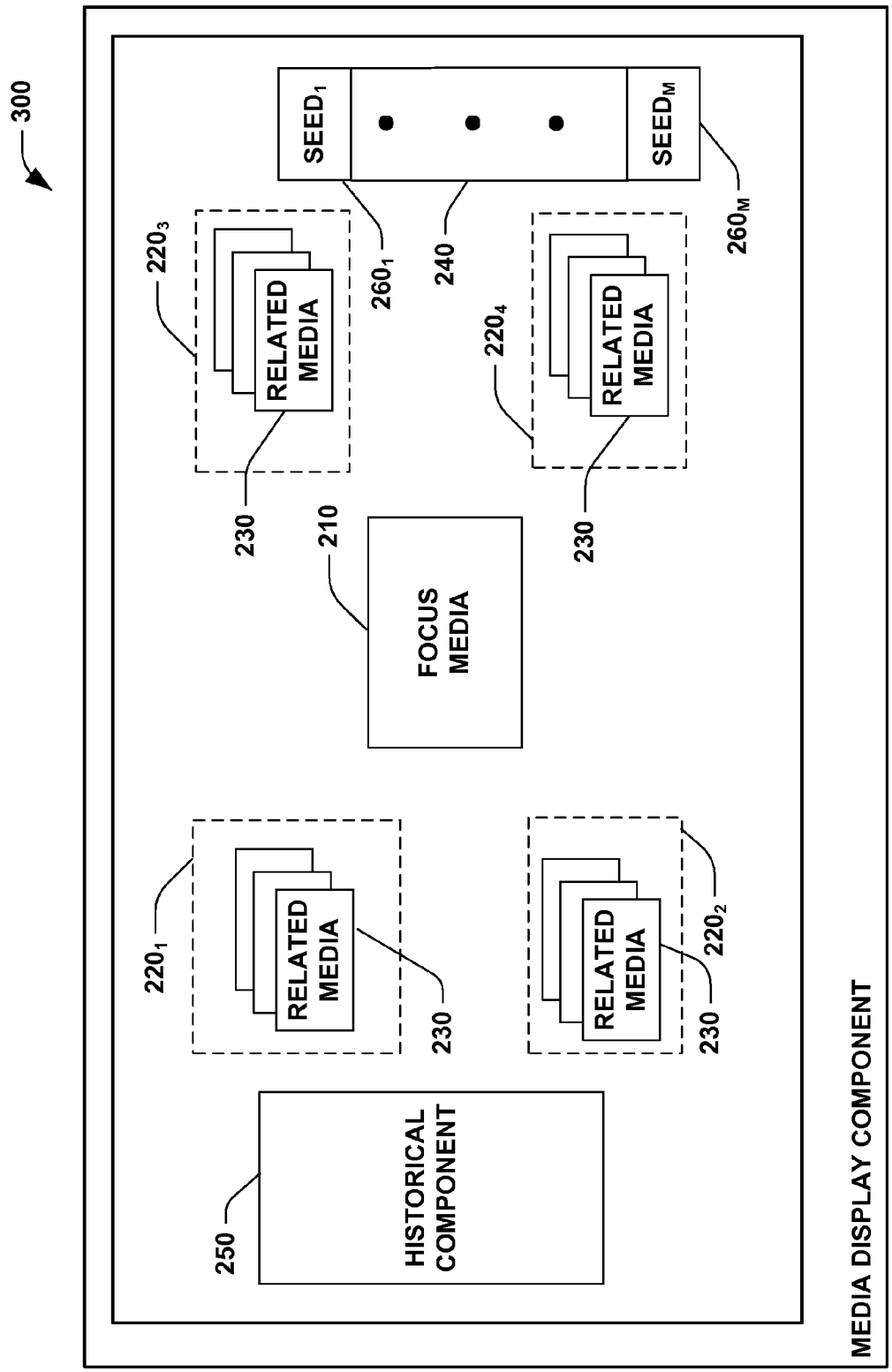
FIG. 3 is a block diagram of a media display component in accordance with an aspect of the present invention.

Turning next to FIG. 3, a media display component 300 in accordance with an aspect of the present invention is illustrated. The media display component 300 includes a focus media 210 and cluster(s) of related media 220 having one or more related media 230. The media display component 300 further includes a seed component 240 and/or an historical component 250. The seed component 240 includes a first seed 2601 through an Mth seed 260M, M being an integer greater to or equal to one. The first seed 2601 through the Mth seed 260M can be referred to collectively as the seed(s) 260.

The seed(s) 260 can be associated with distinctive focus media. The seed(s) 260 can be representative starting point(s) within a database storing media (not shown). The seed(s) 260 can provide different starting point(s) for browsing of media. In one example, a seed 260 is representative of a subgenre of which the seed 260 is a part. In another example, a seed 260 is not representative of a subgenre of which the seed 260 is a part. Selection of a particular seed 260 thus facilitates browsing of media related to the seed 260. Accordingly, the seed(s) 260 can allow a user to start or restart browsing of media.

For example, the seed(s) 260 can be genres of movies (e.g., westerns, movies with the word "seven" in the title, musicals, action, comedy, suspense, drama and/or science fiction etc.) Selection of a particular seed 260 causes the focus media 210 and the cluster(s) of related media 220 to be modified.

The historical component 250 stores historical information associated with user browsing of media. The historical information can be stored based, at least in part, upon user preference(s). For example, the historical component 250 can store a particular quantity of recent browsing session(s). Additionally and/or alternatively, the historical component 250 can store user browsing session(s) for the past day, week and/or month. It is to be appreciated that the historical component 250 can be a computer component as that term is defined herein.

Figure 4:
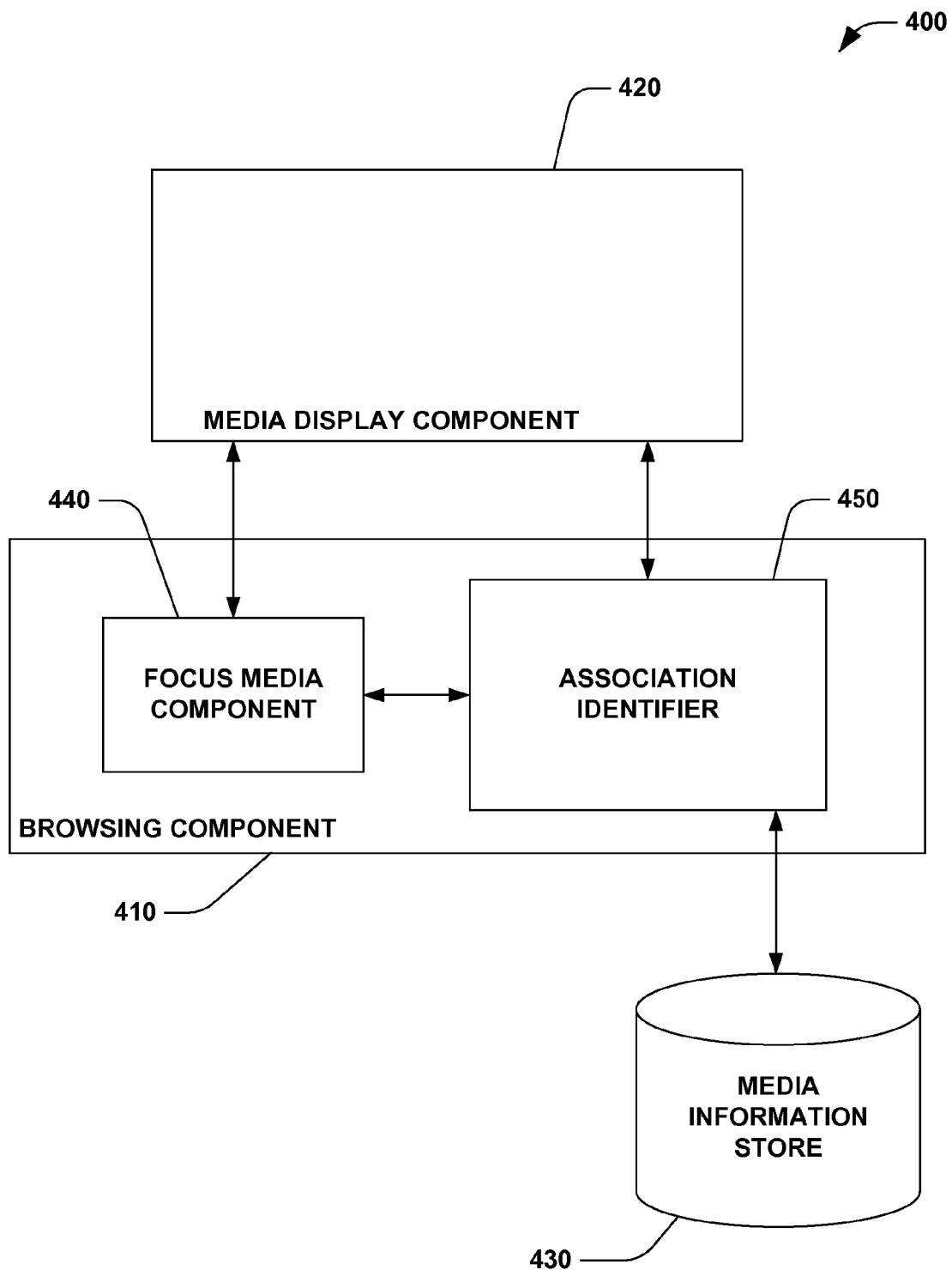
FIG. 4 is a block diagram of a media browsing system in accordance with an aspect of the present invention.

Referring to FIG. 4, a media browsing system 400 in accordance with an aspect of the present invention is illustrated. The media browsing system 400 includes a browsing component 410 and a media display component 420. Optionally, the media browsing system 400 includes a media information store 430. The media display component 420 displays the focus media and the cluster(s) of related media. The media display component 420 is coupled to the browsing component 410. In one example, the media browsing system 400 is a stand-alone system. In another example, the media browsing system 400 is a distributed system with the media display component 420 and the browsing component 410 coupled via the Internet and/or a computer network.

The browsing component includes a focus media component 440 and an association identifier 450. The focus media component 440 provides the focus media and/or cluster(s) of related media to the media display component 420. The cluster(s) of related media can be based, at least in part, upon information received from the association identifier 450. The association identifier 450 associates media related to the focus media based, at least in part, upon metadata associated with the focus media and metadata associated with the related media. The association identifier 450 can analyze the focus media and identify related media based, at least in part, upon metadata associated with the focus media and the related media. Further, the association identifier 450 can group related media into cluster(s) based, at least in part, upon metadata associated with the related media, metadata associated with the focus media and/or user preference(s).

Additionally, the association identifier 450 can utilize artificial intelligence techniques (e.g., Bayesian learning methods that perform analysis over alternative dependent structures and apply a score, Bayesian classifiers and other statistical classifiers, including decision tree learning methods, support vector machines, linear and non-linear regression and/or neural network representation) in analyzing the related media and/or cluster(s) with regard to the focus media. Further, the association identifier 450 can store information regarding a user's preference(s) regarding the selection of focus media (e.g., historical information) and/or information regarding the user (e.g., demographic information), for example, received from a user selection component (not shown). Accordingly, the association identifier 450 can adaptively analyze media input taking into account a user's preference(s) and/or information regarding a user.

For example, if a first user has a preference for movies in which actor A is featured, the association identifier 450 can search the media information 430 for movies featuring actor A. Additionally, the association identifier 450 can store the fact that the first user has a preference for movies in which actor A is featured. The association identifier 450 can analyze preferences of a plurality of viewers and aggregate such preferences to facilitate optimizing the media browsing experience for the group of viewers as a whole. Furthermore, the association identifier 450 can cluster related media based, at least in part, upon information associated with a user (e.g., historical information regarding previous selection(s) of focus media by the user and/or demographic information), user preference(s) (e.g., quantity of clusters to be displayed), and/or information regarding the user (e.g., demographic information associated with the user). For example, if a user is historically known to prefer action to comedy movies then the system will prioritize action movies over comedy movies given an exploration by the user.

The media information store 430 stores media and associated metadata. For example, the media information store 430 can store media such as movies, TV programs, music, e-mail, web pages, photographs, books, art collections, recipes and/or travel related information. Additionally, the media information store 430 stores metadata associated with the media. For example, in the instance that the media is movies, the metadata can include actor(s) and/or actress(es), director(s), producer(s), release date, rating and/or running time. The media information store can include computer storage media (e.g., hard disc, CD's and/or DVD's). The media information store 430 can be coupled to the browsing component 410 via, for example, a parallel electrical connection, a serial electrical connection, a computer network connection (e.g., utilizing the Internet), a Digital Subscriber Line ("DSL"), a telephone line, a cable modem, a wireless data communications link and/or integrated services digital network ("ISDN").

It is to be appreciated that the media browsing system 400, the browsing component 410, the media display component 420, the focus media component 440 and/or the association identifier 450 can be computer component(s) as that term is defined herein.

Figure 5:
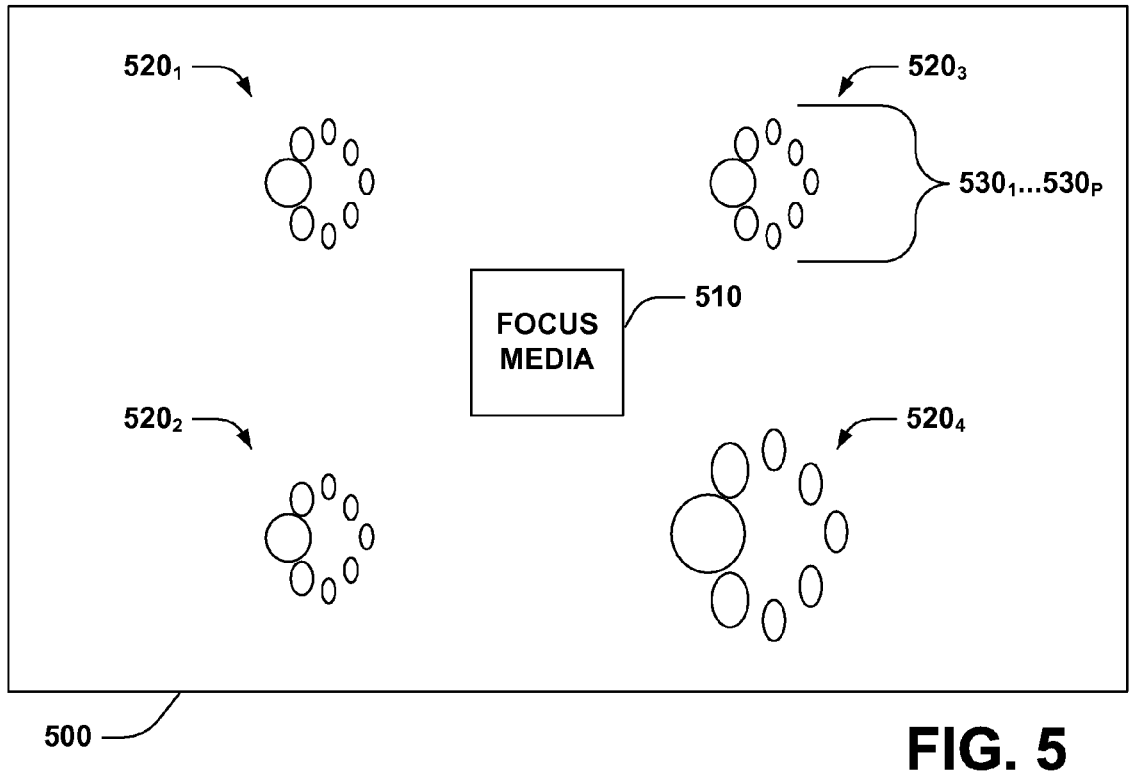
FIG. 5 is a block diagram of an exemplary user interface in accordance with an aspect of the present invention.

Turning to FIG. 5, an exemplary user interface 500 in accordance with an aspect of the present invention is illustrated. For example, the user interface 500 can be displayed via a media display component. The user interface 500 includes a focus media 510 and cluster(s) 520 having a first related media 5301 through a Pth related media 530P, P being an integer great to or equal to one. The first related media 5301 through the Pth related media 530P can be referred to collectively as the related media 530. The related media 530 within a cluster 520 share common metadata attribute(s). In the example illustrated in FIG. 5, upon selection of a cluster (e.g., cluster 5204), the selected cluster 520 is enlarged on a display (e.g., of a media display component), thus allowing more display space to be utilized by the selected cluster 520 and its associated related media 530.

Figure 6:
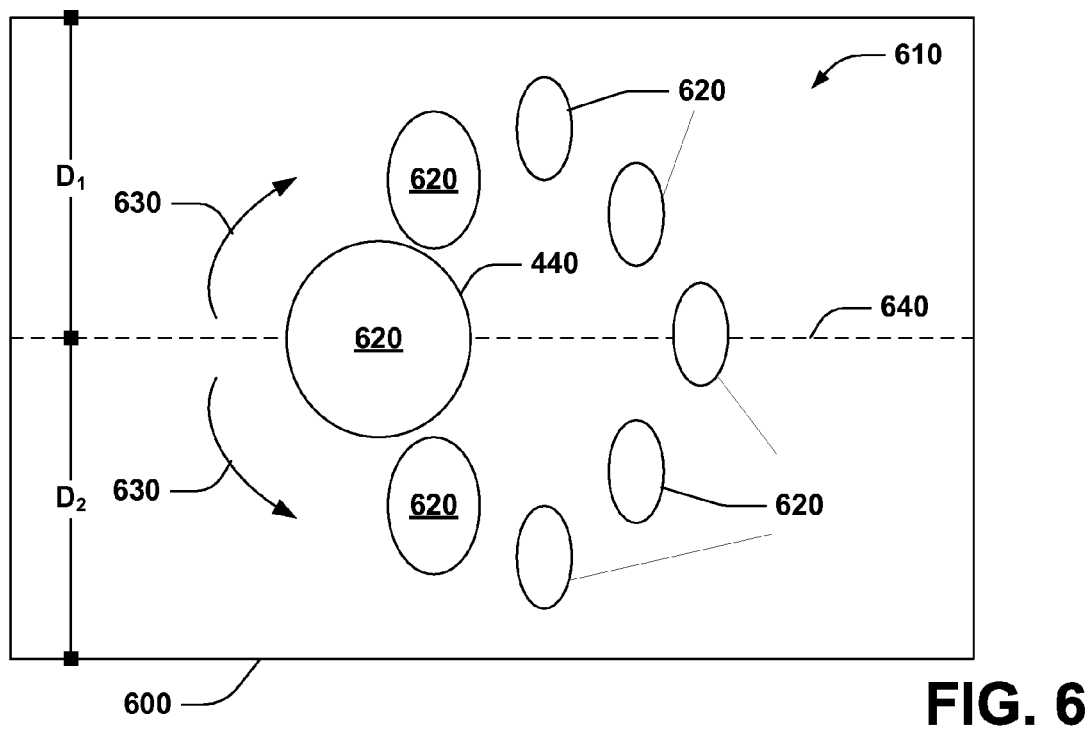
FIG. 6 is a block diagram of an exemplary user interface in accordance with an aspect of the present invention.

Turning briefly to FIG. 6, an exemplary user interface 600 in accordance with an aspect of the present invention is illustrated. The user interface 600 includes a cluster 610 having related media 620. The user interface 600 further includes a scrolling component 630. The scrolling component 630 allows a user to scroll through the related media 620. The scrolling component 630 can facilitate uni-directional and/or bi-directional scrolling of related media. The cluster 610 can have an associated physical display area; thus, when a user selection device (not shown) selects (e.g., points) to an area within the associated physical display area associated with the scrolling component 630, the related media 620 of the cluster 610 can be scrolled, thus facilitating user visual browsing.

In one example, the speed of the scrolling component 630 is dependent upon the distance of the user selection device (not shown) from the horizontal centerline of the cluster 610. When a user desires to scroll through a cluster 610, the user can utilize the user selection device (e.g., a mouse and/or pointing device). The speed and/or direction in which the user can scroll through the cluster 610 can depend on the distance D1 or D2 (e.g., distance on display unit, up (D1) and down (D2)) of the user selection device (e.g., a mouse pointer) from the horizontal centerline 640 of the cluster 610. As the user moves the user selection device away from the centerline 640, the scrolling speed of the related media 620 of the cluster 610 increases. Additionally and/or alternatively, physical attribute(s) of the related media 620 can change (e.g., fade out) as the related media 620 of the cluster 610 is scrolled through.

In view of the exemplary systems shown and described above, methodologies that may be implemented in accordance with the present invention will be better appreciated with reference to the flow charts of FIGS. 7, 8, 9 and 10. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 7:
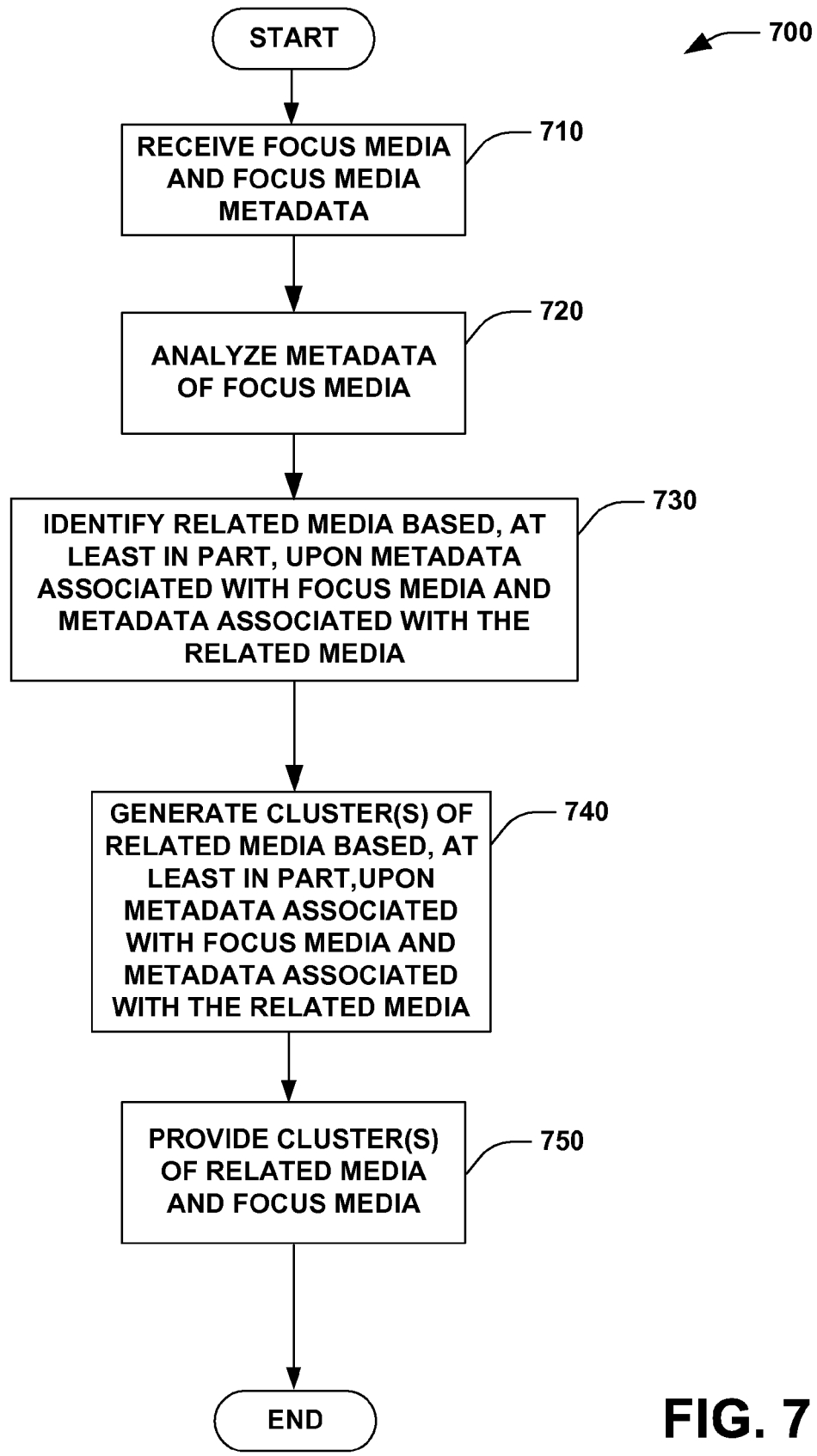
FIG. 7 is a flow chart illustrating a methodology for providing media related to focus media in accordance with an aspect of the present invention.

Turning to FIG. 7, a methodology 700 for providing media related to focus media in accordance with an aspect of the present invention is illustrated. At 710, focus media and metadata associated with the focus media are received. At 720, the metadata associated with the focus media is analyzed (e.g., by an association identifier). At 730, related media are identified based, at least in part, upon metadata associated with the focus media and metadata associated with the related media (e.g., utilizing artificial intelligence technique(s)). At 740, cluster(s) of related media are generated based, at least in part, upon metadata associated with the focus media and metadata associated with the related media (e.g., utilizing artificial intelligence technique(s)). Next, at 750, cluster(s) of related media and the focus media are provided (e.g., to a media display component).

Figure 8:
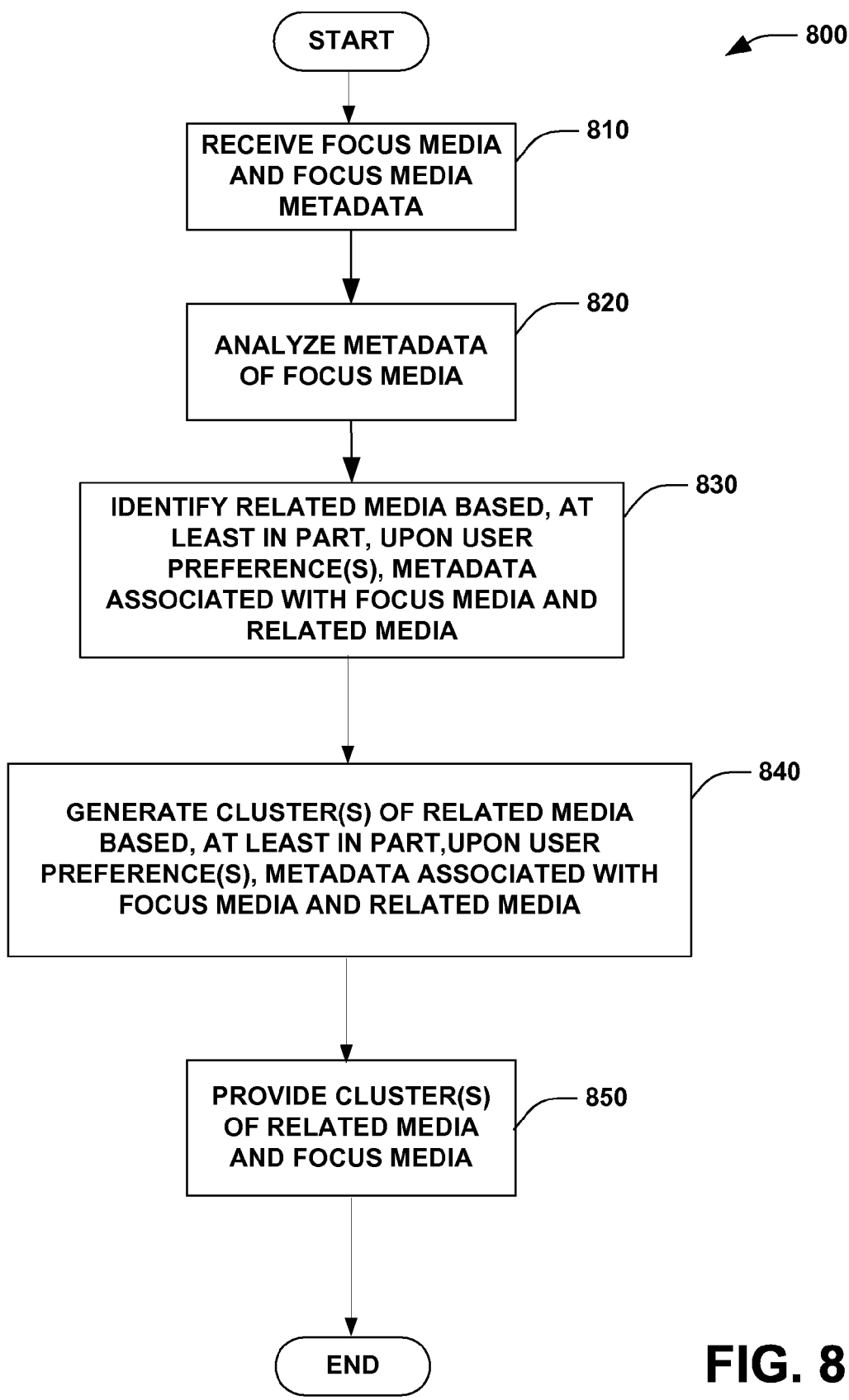
FIG. 8 is a flow chart illustrating a methodology for providing media related to focus media in accordance with an aspect of the present invention.

Next, referring to FIG. 8, a methodology 800 for providing media related to focus media in accordance with an aspect of the present invention is illustrated. At 810, focus media and metadata associated with the focus media are received. At

820, the metadata associated with the focus media is analyzed (e.g., by an association identifier). At 830, related media are identified based, at least in part, upon user preference(s), metadata associated with the focus media and related media. For example, user preference(s) can specify a quantity of cluster(s) to be displayed, a quantity of related media per cluster and/or information associated with clustering.

At 840, cluster(s) of related media are generated based, at least in part, upon metadata associated with user preference(s), the focus media and the related media. Next, at 850, cluster(s) of related media and the focus media are provided (e.g., to a media display component).

Figure 9:
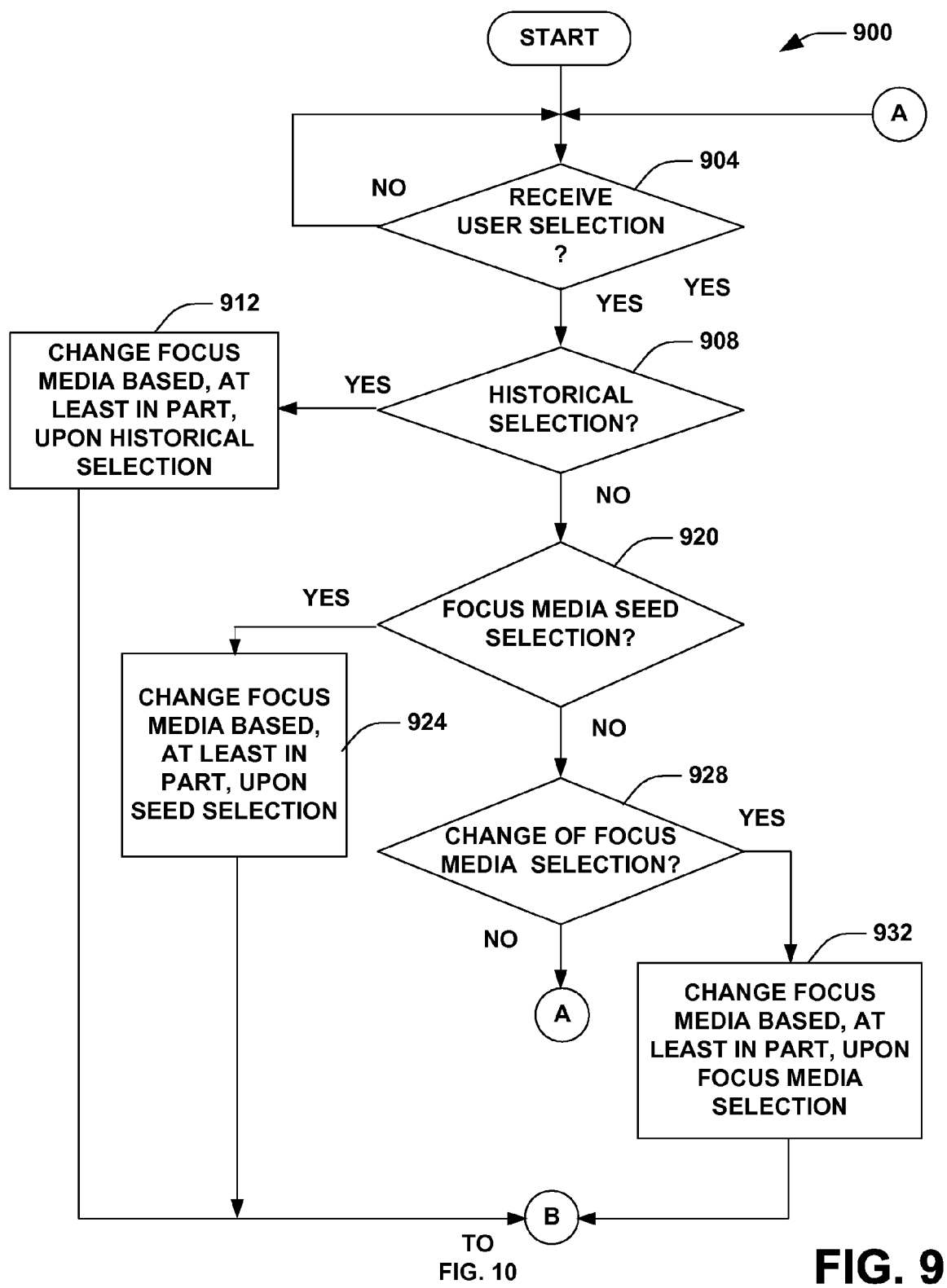
FIG. 9 is a flow chart illustrating a methodology for visually browsing media in accordance with an aspect of the present invention.
Figure 10:
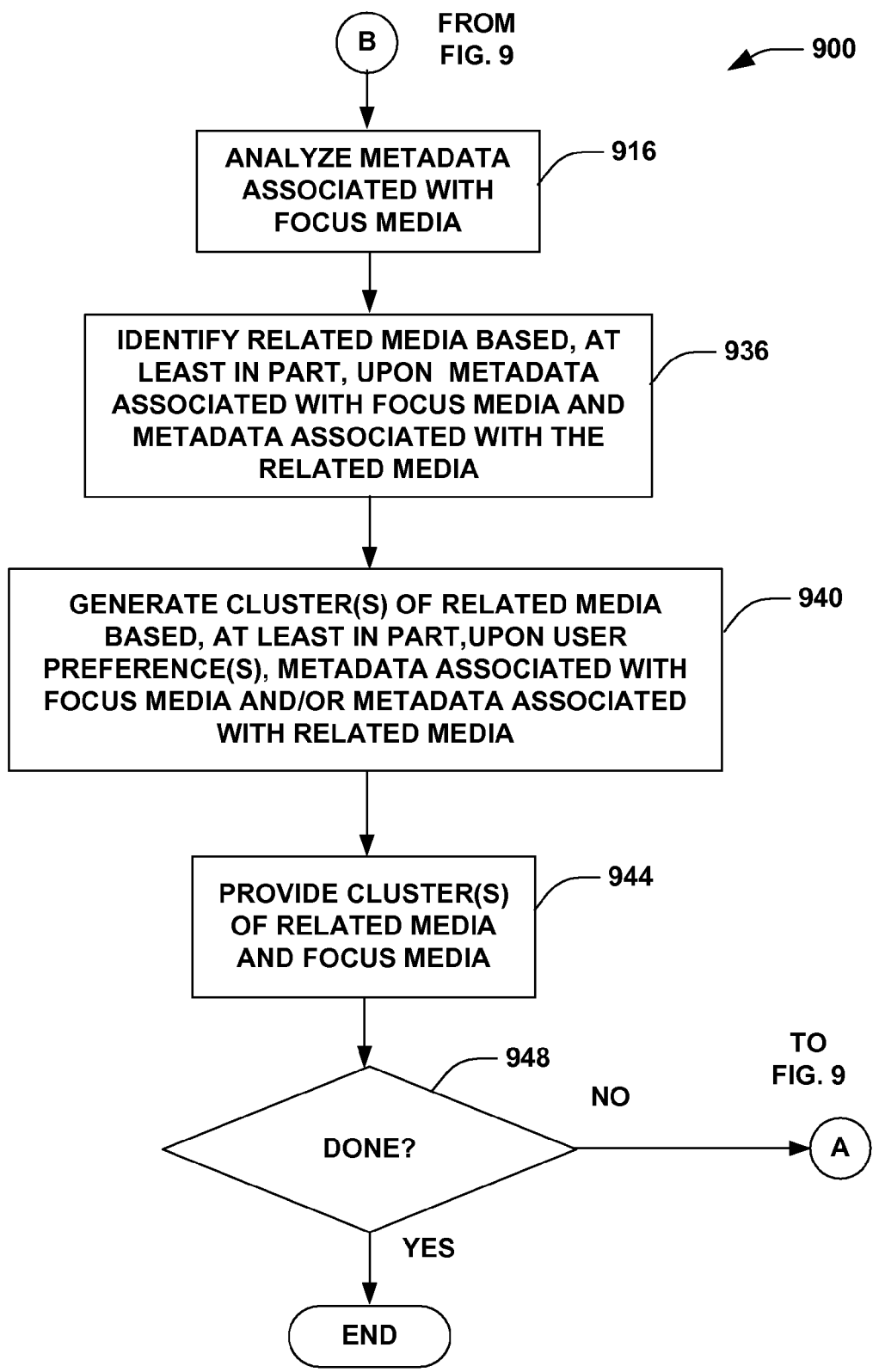
FIG. 10 is a flow chart further illustrating the methodology of FIG. 9.

Referring to FIGS. 9 and 10, a methodology 900 for visually browsing media in accordance with an aspect of the present invention is illustrated. At 904, a determination is made as to whether a user selection has been received. If the determination at 904 is NO, processing continues at 904. If the determination at 904 is YES, at 908, a determination is made as to whether the user selection is an historical selection. If the determination at 908 is YES, at 912, the focus media is changed based, at least in part, upon the historical selection and processing continues at 916. If the determination at 908 is NO, at 920, a determination is made as to whether the user selection is a seed selection. If the determination at 920 is YES, at 924, the focus media is changed based, at least in part, upon the seed selection and processing continues at 916. If the determination at 920 is NO, at 928, a determination is made as to whether the user selection is a focus media selection (e.g., user has selected a related media). If the determination at 928 is YES, at 932, the focus media is changed based, at least in part, upon the focus media selection. If the determination at 928 is NO, processing continues at 904.

At 916, metadata associated with the focus media is analyzed. At 936, related media is identified based, at least in part, upon metadata associated with the focus media and metadata associated with the related media. At 940, cluster(s) of related media are generated based, at least in part, upon user preference(s), metadata associated with the focus media and/or metadata associated with the related media. At 944, cluster(s) of related media and the focus media are provided (e.g., to a media display component). At 948, a determination is made whether the user is done. If the determination at 948 is NO, processing continues at 904. If the determination at 948 is YES, no further processing occurs.

Figure 11:
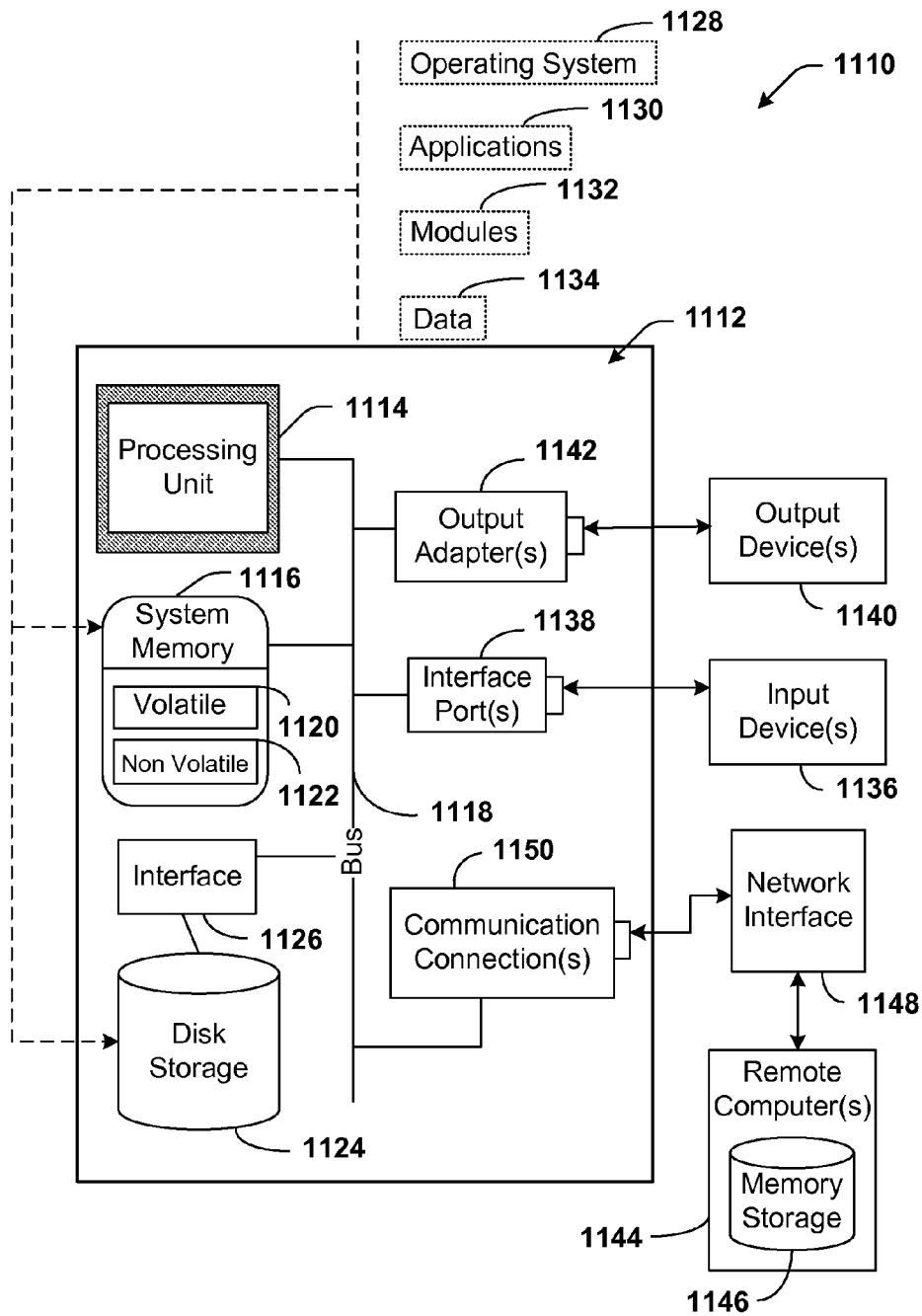
FIG. 11 is a schematic block diagram of an exemplary operating environment for a system configured in accordance with the present invention.

In order to provide additional context for various aspects of the present invention, FIG. 11 and the following discussion are intended to provide a brief, general description of a suitable operating environment 1110 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A media browsing system embodied on a computer memory, comprising:
   a media display component that displays a focus media and at least one cluster of related media, the quantity of clusters of related media being based, at least in part, upon a user specified quantity of clusters; and,
   a browsing component coupled to the media display component, the browsing component providing the focus media and the at least one cluster of related media to the media display component.

2. The system of claim 1, wherein the browsing component provides the focus media and the at least one cluster of related media to the media display component based at least in part, upon metadata associated with the focus media and the at least one cluster of related media.

3. The system of claim 2, wherein the browsing component further clusters the related media based, at least in part, upon metadata associated with the related media.

4. The system of claim 1, wherein the browsing component further modifies the focus media provided to the media display component based, at least in part, upon a user's selection of a related media within a cluster of related media.

5. The system of claim 4, wherein the browsing component further modifies the clustered related media based, at least in part, upon the modified focus media.

6. The system of claim 5, wherein the browsing component further provides information associated with the modified focus media and modified clusters of related media.

7. The system of claim 1, further comprising a scrolling component that facilitates a user's browsing of media.

8. The system of claim 1, further comprising a user selection component that provides information associated with a user preference to the browsing component.

9. The system of claim 8, the user preference being further related to at least one of a quantity of clusters of related media and a quantity of related media in a cluster.

10. The system of claim 1, further comprising a media information store that stores information associated with media, the information including metadata associated with media.

11. The system of claim 1, further comprising a historical component that stores information associated with a user's historical exploration of media.

12. The system of claim 1, further comprising a seed component that provides a plurality of distinctive focus media.

13. The browsing system of claim 1, wherein the browsing component includes an association identifier that employs a probabilistic methodology in identifying media related to the focus media.

14. A method for providing media related to focus media, comprising:
   generating one or more clusters of media related to a focus media via a computer executable component, the quantity of the clusters of related media being based at least upon a user preference that is inputted to the computer executable component via a user input device; and,
   displaying the one or more clusters of media and the focus media on a media display.

15. The method of claim 14, further comprising identifying media related to the focus media based, at least in part, upon metadata associated with the focus media and metadata associated with the related media.

16. The method of claim 14, further comprising at least one of:

utilizing an artificial intelligence technique to generate the one or more clusters of related media; and, utilizing an artificial intelligence technique to identify the related media.

17. The method of claim 14, wherein the generating further includes generating the one or more clusters of related media based at least upon media within a cluster having at least one common metadata.

18. A media browsing system, comprising:

one or more processors;

a computer memory;

a computer readable media that comprises a plurality of computer-executable components, the plurality of computer-executable components comprising:

a focus media component that provides a focus media and one or more clusters of related media, the quantity of the clusters of related media being based at least upon a user selection;

a media display component that presents the focus media and the one or more clusters of related media on a display.

19. The system of claim 18, wherein the computer-executable components further comprise an association identifier that identifies media related to the focus media based, at least in part, upon metadata associated with the focus media and metadata associated with the related media.

20. The system of claim 19, wherein the association identifier is to further cluster the related media based, at least in part, upon metadata associated with the related media.

* * * * *